United States Patent [19]

Pohl

[11] 4,354,939
[45] Oct. 19, 1982

[54] REVERSE OSMOSIS DESALINIZATION UTILIZING PLURAL FLOW WORK EXCHANGE VESSELS

[75] Inventor: Kurt M. Pohl, Gummersbach, Fed. Rep. of Germany

[73] Assignee: L. & C. Steinmüller GmbH, Gummersbach, Fed. Rep. of Germany

[21] Appl. No.: 234,186

[22] Filed: Feb. 13, 1981

Related U.S. Application Data

[63] Continuation of Ser. No. 56,926, Jul. 12, 1979, abandoned.

[30] Foreign Application Priority Data

Jul. 14, 1978 [DE] Fed. Rep. of Germany ....... 2830987
Jun. 21, 1979 [DE] Fed. Rep. of Germany ....... 2924971

[51] Int. Cl.³ .............................................. B01D 13/00
[52] U.S. Cl. .................................... 210/637; 210/652
[58] Field of Search ................... 137/205, 209; 138/37, 138/39; 222/394, 395, 547, 564; 417/92, 103, 118, 394, 395; 210/651–655, 637, 134, 137, 257.2, 258, 321, 433.2

[56] References Cited

U.S. PATENT DOCUMENTS

| 1,141,543 | 6/1915 | Hays | 417/92 |
|---|---|---|---|
| 2,227,646 | 1/1941 | Hillmann | 137/205.5 |
| 3,489,159 | 1/1970 | Cheng et al. | 210/321 |
| 3,496,879 | 2/1970 | Brandes | 417/395 |
| 3,794,173 | 2/1974 | Bray | 210/321 X |
| 4,124,488 | 11/1978 | Wilson | 210/134 |

OTHER PUBLICATIONS

Cheng, Chen-Yen et al., "Flow Work Exchanger", Aiche Journal, vol. 13, No. 3, May 1967, pp. 438–442.

*Primary Examiner*—Charles N. Hart
*Assistant Examiner*—David R. Sadowski
*Attorney, Agent, or Firm*—Becker & Becker, Inc.

[57] ABSTRACT

A method of desalinating solutions by reverse osmosis into a salt-poor permeate and a salt-rich concentrate is disclosed. The method includes the steps of supplying solution to a reverse osmosis unit, supplying concentrate leaving the reverse osmosis unit to a treatment container or containers while simultaneously withdrawing a predetermined amount of solution. Some of the solution is also supplied to another space of one of the containers so that practically pressure-less concentrate is conveyed to the environment. The sequence of steps can be reversed in which the containers are supplied so that concentrate collected in the space of the container not being supplied with solution is available for being conveyed to the environment.

1 Claim, 12 Drawing Figures

REVERSE OSMOSIS DESALINIZATION UTILIZING PLURAL FLOW WORK EXCHANGE VESSELS

This is a continuation application of Ser. No. 56,926, filed July 12, 1979 abandoned being based on German Patent Applications Ser. Nos. P 28 30 987.7 filed July 14, 1978 and P 29 24 971.6 filed June 21, 1979 as claimed for priority under 35 USC 119.

The present invention relates to a method of desalinating solutions by reverse osmosis and, in particular, to separating a salt containing solution into a salt-poor permeate and a salt-rich concentrate.

Separating salt containing solutions by reverse osmosis into a salt-poor so-called permeate and into a concentrate which, in comparison to the salt containing solution flowing to the reverse osmosis unit, is concentrated, is known in the art. Thus, for example, water to be used in industry or drinking water is produced from brackish water or sea water which essentially contains common salt. The reverse osmosis part proper of such a unit is shown in a simplified manner in FIG. 1.

Figure 1:
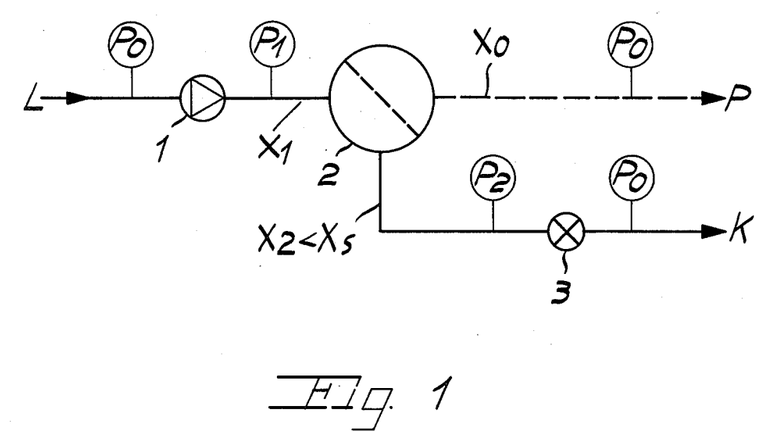
FIG. 1 is a general flow diagram of the reverse osmosis part of a unit for producing water from brackish water or sea water.

A delivery pump 1 increases the atmospheric pressure $P_o$ of the solution 2, which is to be desalinated, to the working pressure $P_1$. In this connection, the following criteria must be fulfulled by this working pressure $P_1$: it must be higher than the osmotic pressure pertaining to the salt concentrations $X_1$, $X_2$, and $X_o$, and it must correspond to the specific characteristics of the respective apparatus, such as the inner pressure drop from $P_1$ to $P_2$ in the reverse osmosis apparatus on the concentrate side as well as the permeate output at a specified or to be specified effective surface of a semipermeable membrane.

The ratio of permeate P as well as concentrate K to the solution L being supplied is limited, and in particular, in the extreme case, by the saturation concentration of the dissolved salts $X_S$ (in which connection $X_2$ must remain less than $X_S$) and in general by the economy of the method, since the osmotic pressure and thereby the working pressure $P_1$ increases considerably in relation to the concentration difference $X_2 - X_o$.

Although in principle the reverse osmosis method as a reversible method can be energy saving, the energy consumption is frequently very high when the ratio of K/L, for the aforementioned reasons, is relatively great, and when the energy recovery from the concentrate cannot be achieved for technical or economical reasons while reducing the pressure from $P_2$ after the reverse osmosis apparatus to the atmospheric pressure $P_o$ (or also to another pressure higher or lower than $P_o$). Thus, to date no successful application of depressurizing devices has become known. Therefore the pressure reduction from $P_2$ to $P_o$ in the concentrate stream K is generally effected in a flow control device or throttling armature 3 while renouncing an energy recovery.

Figure 21:
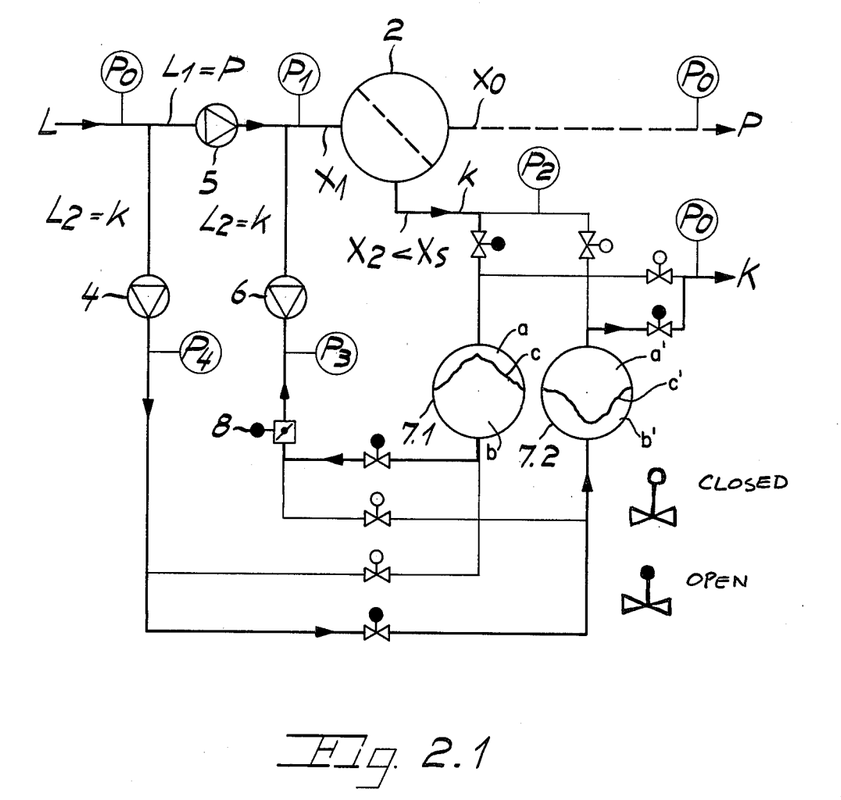
Figure 22:
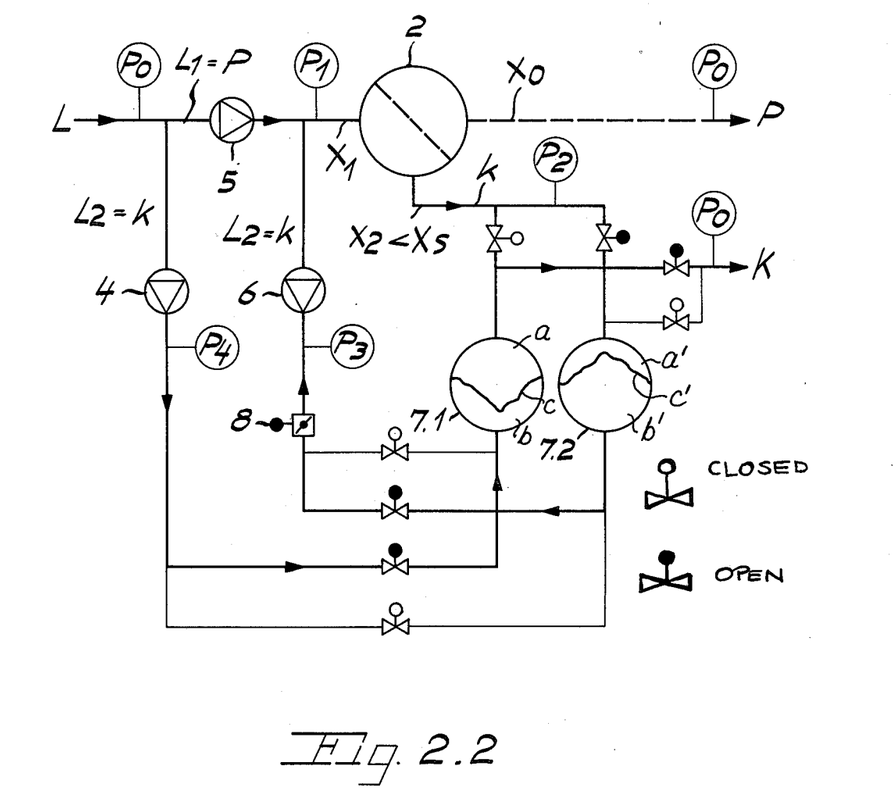

By using an already previously proposed method with a corresponding apparatus, the utilization of a depressurizing device in place of the throttling armature 3 can, however, be dispensed with, while nevertheless the potential energy of the concentrate K can be recovered with a high degree of efficiency. This method is shown in FIGS. 2.1 and 2.2 for two alternating phases of operation.

In this connection, the solution stream L is divided into two streams: a stream $L_1 = P$ (permeate) and a stream $L_2 = K$ (concentrate). The delivery pump 5 increases the pressure of $L_1$ from the atmospheric pressure $P_o$ to the working pressure $P_1$. The delivery pump 4 likewise has to increase the pressure of the second stream $L_2$ from the atmospheric pressure $P_o$ to an only slightly higher pressure $P_4$. As shown in FIG. 2.1, at this pressure $P_4$ a certain volume of concentrate is to be conveyed from the membrane dual space container 7.2 into the atmosphere while overcoming pressure losses described subsequently. With the exception of the reverse osmosis unit 2, the entire apparatus operates periodically. However, the solution L flows continuously to the apparatus, and the concentrate K flows out intermittently for quasi-continuously.

The membrane dual space containers 7.1 and 7.2, also known as Flow Work Exchangers, comprise a pressure body which is divided into two chambers or spaces which are variable as to volume by means of a membrane.

A practical utilization of the proposed principle has, however, not become known up to date, presumably due to the difficulties involved in its practical application. The membranes which divide the pressure body into two spaces can work durably and reliably only if the pressure bodies and membranes are formed so as to be suitably geometrically adapted to each other.

It is therefore an object of the present invention to provide a practical and economical method for accomplishing the aforementioned separation.

This object, and other objects and advantages of the invention, will appear more clearly from the following specification in connection with the accompanying drawings, in which:

FIG. 2.1 is a particular flow diagram, similar to FIG. 1, indicating a first operating phase;

FIG. 2.2 is a flow diagram similar to FIG. 2.1, indicating a second operating phase;

The object of the present invention is achieved if the membranes, in the two extreme positions, can fully engage the inner peripheries of the pressure bodies.

Figure 7:
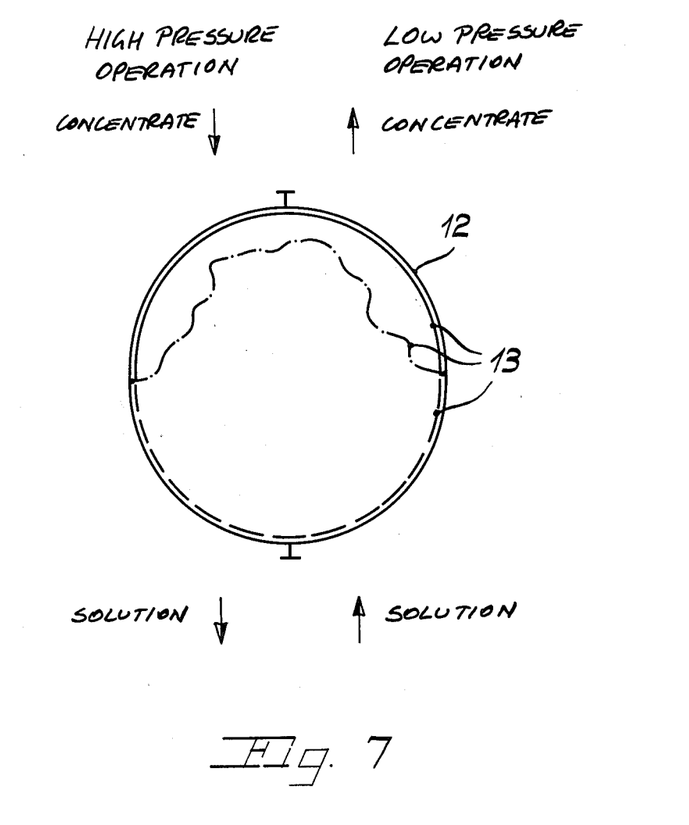
FIGS. 7 to 9 diagrammatically indicate possible configurations of membrane dual space containers having a generally horizontally disposed (sheet-type) membrane.
Figure 8:
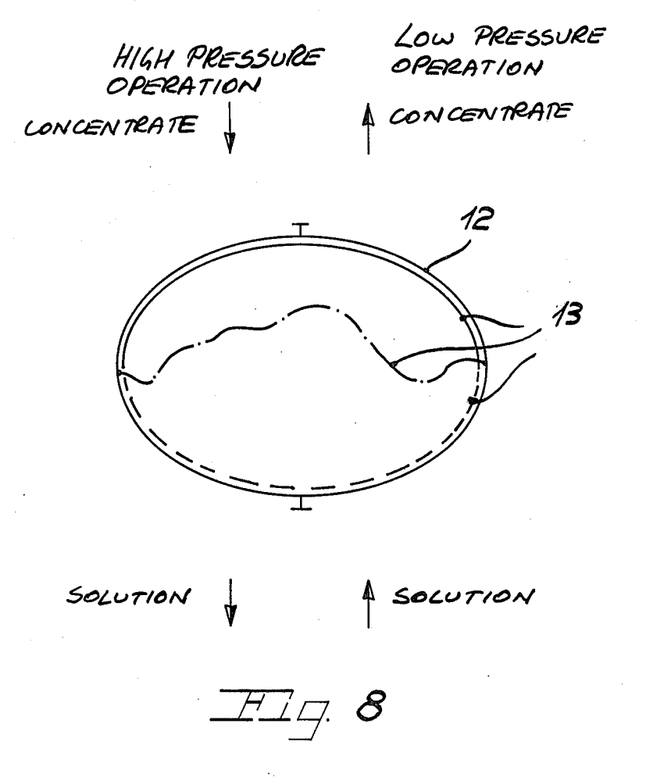

The expedient shape of containers of the present invention is illustrated in FIGS. 7–10. In these figures the reference numeral 12 respectively desginates the pressure tank and the reference numeral 13 respectively designates the membrane. In FIG. 7, the pressure body is a sphere and the membrane is a flexible or elastic hemisphere which is fastened on the periphery of the sphere. In FIG. 8, an ellipsoidal body of rotation replaces the sphere, while in FIG. 9 a double cone is used.

Figure 9:
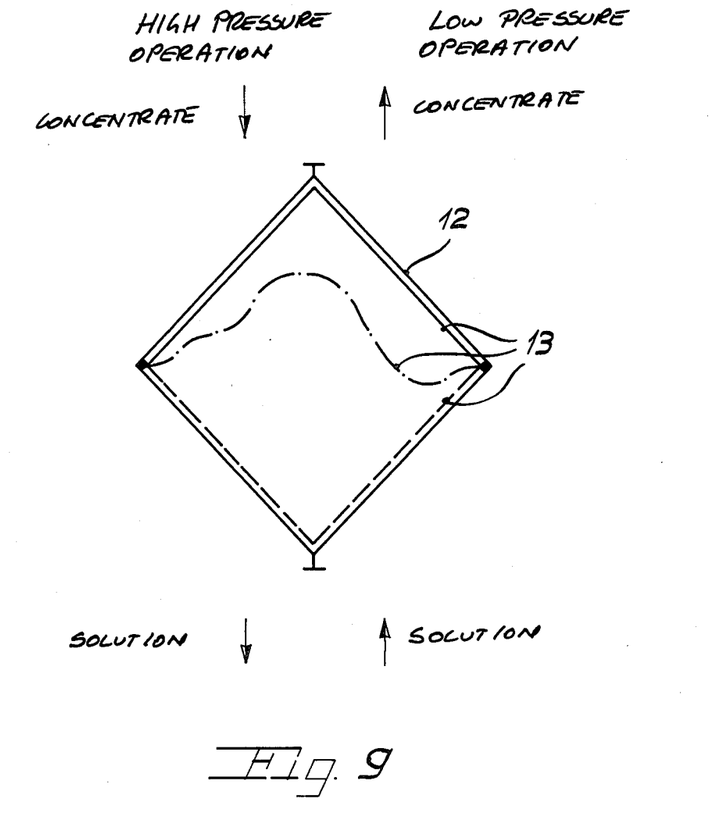
Figure 10:
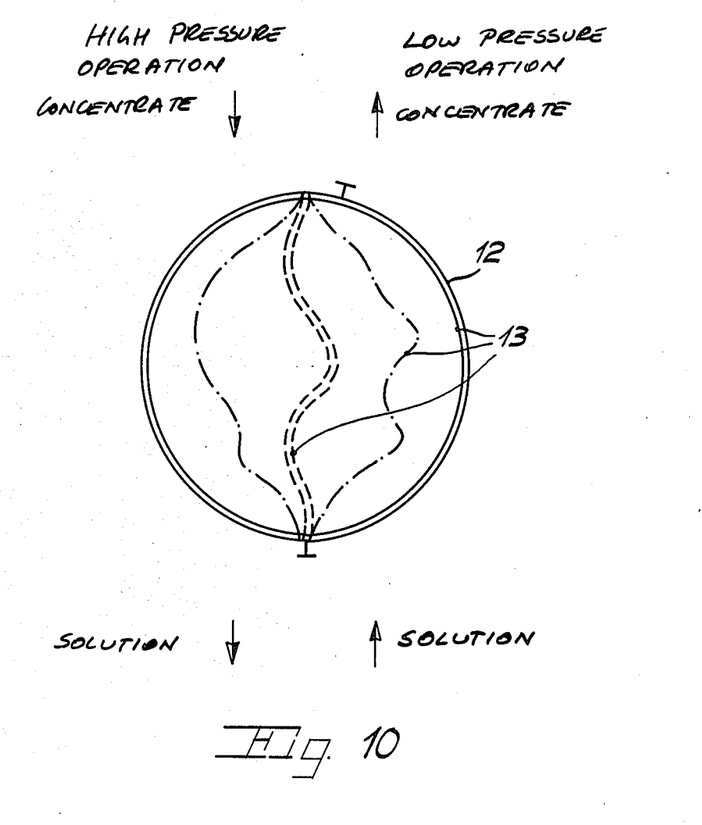
FIG. 10 indicates a membrane dual space container having a bladder-type membrane.

All of the configurations shown in FIGS. 7 to 9 prevent the membrane (sheet-type) from becoming tangled in the extreme positions and, accordingly, no damage is possible to the membrane from the effect of pressure. A similar effect can also be achieved if a membrane 13 is arranged in a spherical pressure tank which membrane can expand according to the principle of a football bag or bladder (see FIG. 10). In this connection, the bladder is fastened to the upper and lower zenith of the sphere while, for example, the lower fastening point is used for introducing fluid into the interior of the bladder.

When using the illustrated dual space container, the concentrate, in the phase of operation shown in FIG. 2.1, flows into the upper chamber of the membrane dual space container 7.1 at the pressure $P_2$ and presses the volume of solution present in the lower portion of the container towards the suction side of the pump 6, which has to overcome the relatively slight pressure difference of $P_1-P_3$. The pressure difference $P_2-P_3$ comprises the elastic resistance of the membrane in the membrane dual space container and the flow resistance in the conduit system. The pressure difference $P_1-P_2$ is the inner pressure drop of the reverse osmosis apparatus. The membrane in the membrane dual space container is practically always free of tensile stresses, or the corresponding tensile forces are specifically limited, since the membrane engages the container wall in the extreme positions and is only stressed in the floating middle positions by its elastic resistance. This tension-free state or tension limitation is significant with respect to a failure of the required reversing control system.

A system-inherent safety is further assured in that, in the two variable spaces or chambers, the solution $L_2$ is found on one side and the concentrate K is found on the other side. In other words, in the event of damage to the membrane, neither the solution $L_2$ nor the concentrate K can enter into the permeate P. The membrane can therefore be extremely flexible. While the solution $L_2$ is being forced out of the container 7.1, solution $L_2$ is forced by the pump 4 into the membrane dual space container 7.2 while the volume of concentrate located on the other side of the membrane is forced out. When no more solution $L_2$ is left in the container 7.1, both containers are reversed as shown in FIG. 2.2. Permeate P and concentrate K flow practically continuously. The control of the shut-off armatures or valves is clearly shown in FIGS. 2.1 and 2.2.

The containers 7.1 and 7.2 are preferably displacement vessels which are divided into first chambers a and a' and second chambers b and b'. The chambers a and a' are separated from the chambers b and b' by flexible walls c and c'. The concentrate K from the osmosis vessel alternately fills and is discharged from the chambers a and a'. The solution L, which is pumped into the input line between the pump 5 and osmosis chamber, alternately flows in and out of the second chambers b and b'.

A reverse osmosis unit can also be operated with more than two dual space membrane containers of the present invention. This can be particularly useful in connection with units having a large capacity or for reasons of technical control.

The advantages of the application of the present invention lie in the possibility of obtaining a considerable saving in energy while still using conventional pumps 4, 5, and 6 without depressurizing devices for the concentrate.

EXAMPLE 20 m$^3$/h drinking water having a salt content of $X_o=500$ ppm were to be produced from 60 m$^3$/h sea water having a salt content of $X_1=38,000$ ppm. The concentration of the concentrate is $X_2=57,000$ ppm. Under these conditions a flat membrane-plate-reverse osmosis unit requires the following operating conditions:

L = 60 m$^3$/h
P = 20 m$^3$/h
K = 40 m$^3$/h
$P_o$ = 1 bar
$P_1$ = 80 bar
$P_2$ = 75 bar.

At a total degree of efficiency of 50%, the power requirement of the pump 1 for a unit similar to that of FIG. 1 is 280 kW or 14 kWh per m$^3$ of permeate.

On the other hand, the power requirement of a unit of the present invention as illustrated in FIGS. 2.1 and 2.2 is, at otherwise identical conditions, with

| $P_3$ = 73 bar | and | $P_4$ = 3 bar | and |
|---|---|---|---|
| $L_1$ = P = 20m$_3$/h | and | $L_2$ = K = 40m$^3$/h: | |
| for pump 4 | | 4.5 kW | |
| for pump 5 | | 93.0 kW | |
| for pump 6 | | 16.5 kW | |
| total | | 114.0 kW | | or 5.7 per m$^3$ of permeate. In contrast to the arrangement of FIG. 1, 60% of the energy, i.e. 8.3 kWh per m$^3$ of permeate, is saved according to the present invention.

Figure 3:
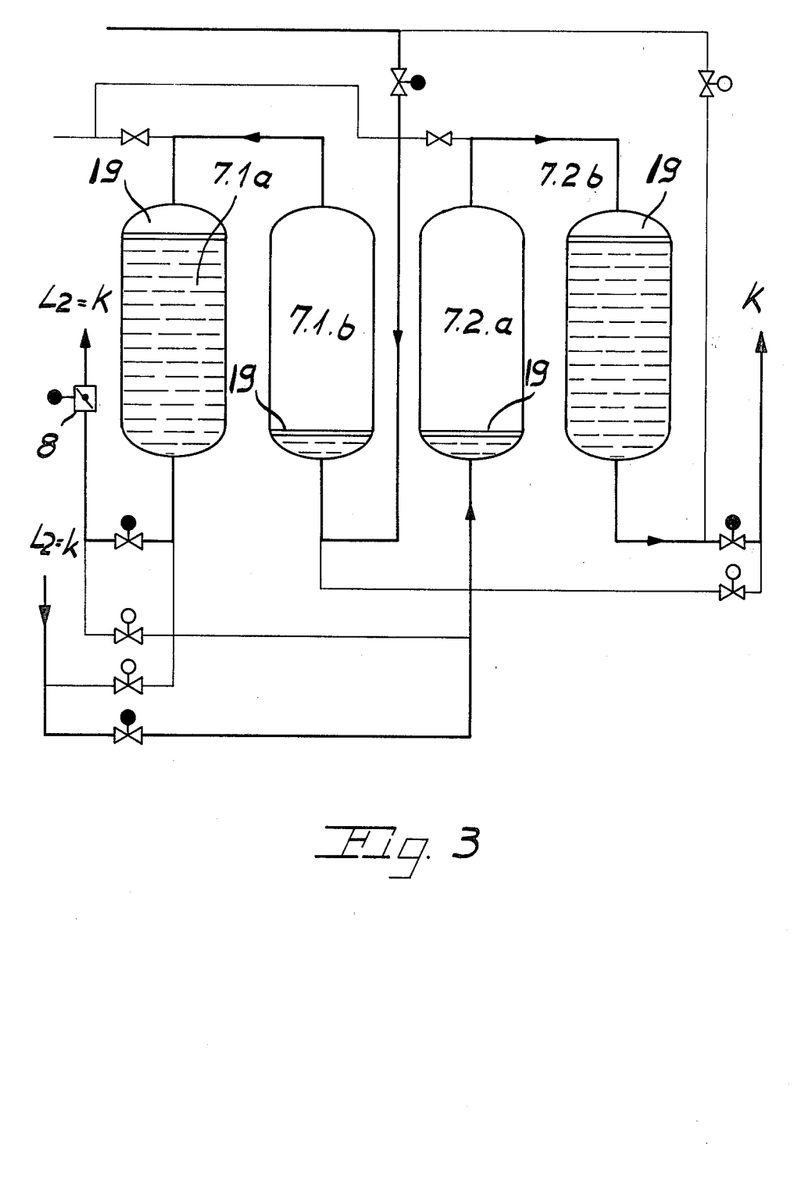
FIG. 3 is a flow diagram of an operating phase in accordance with FIG. 2.1 in which the spaces of the membrane dual space containers are separated from one another.

A further possibility for using the energy saving method of the present invention is shown in FIG. 3 for the phase of operation corresponding to FIG. 2.1. In this connection, the spaces of the membrane dual space containers are separated from one another (7.1 into 7.1a and 7.1b; 7.2 into 7.2a and 7.2b), and the separating membranes are replaced by a gas cushion. Since the cushion gas will dissolve with time in the fluid, the gas must be intermittently or continuously replenished. To reduce the material exchange surface for the cushion gas absorption, the free fluid surface in the containers 7.1a, 7.1b, 7.2a and 7.2b, pursuant to the present invention, is covered with a floating layer 19 which restricts or prevents diffusion.

Figure 4:
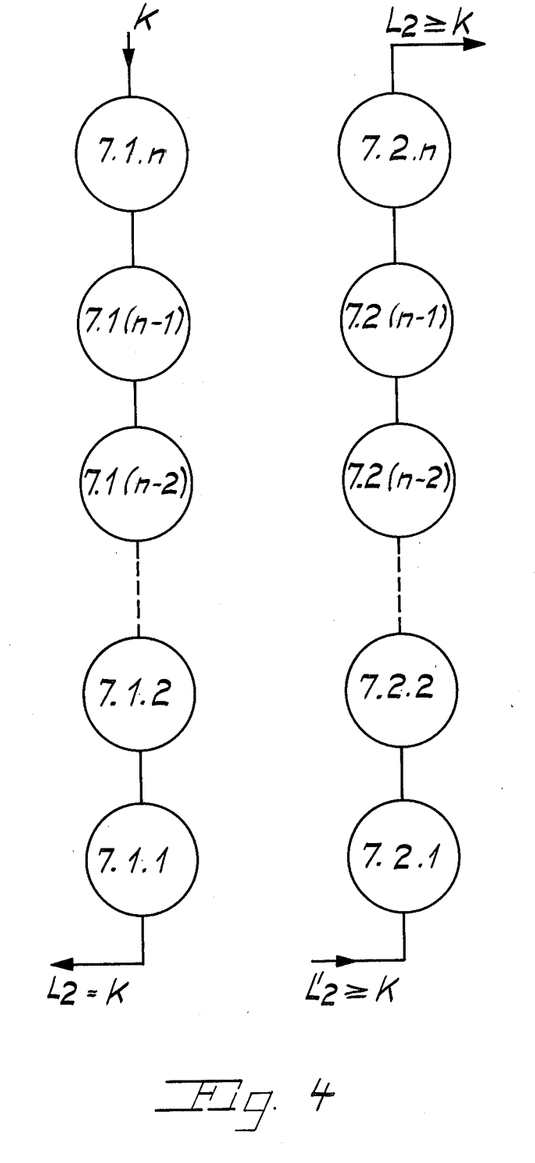
FIG. 4 is a diagrammatic representation indicating the utilization of a series of containers in place, respectively, of two containers.
Figure 5A:
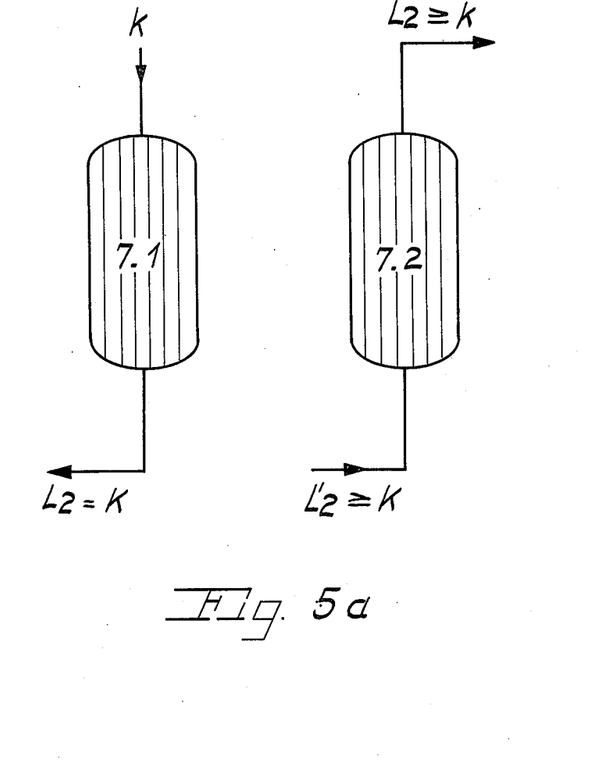
FIGS. 5a and 5b, respectively, are flow diagrams indicating divided containers.
Figure 5B:
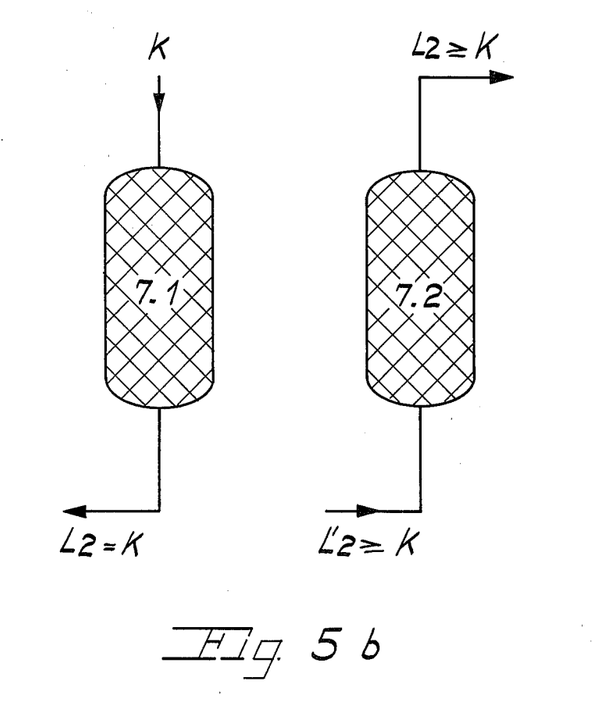

It is further possible according to the present invention to partially replace the membranes in the membrane dual space containers in their separating action by suitable guiding of the flow. FIGS. 4, 5a and 5b show the various possibilities of utilizing a plug or air-pressure flow for such a substitution.

In this connection, use is made of the aforementioned fact that an intermixing (which is slight as inherent to the respective system, or which is extensive during a disturbance of the apparatus) of the solution L and the concentrate K is not detrimental to the quality of the produced permeate P (see FIGS. 1, 2.1 and 2.2).

As shown in FIG. 4, the containers 7.1 and 7.2 have been respectively replaced by a series of n-containers through which flow is effected in different directions in the two alternating phases of operation. In the left half in FIG. 4 the concentrate K pushes the solution $L_2$ at high pressure to the pressure increasing pump of the reverse osmosis unit. In the right half of FIG. 4 a volume stream $L'_2 \geq K$ pushes an excess of the concentrate K at low pressure into the environment. The concentrations in the individual containers 7.1.n to 7.1.1 or 7.2.n to 7.2.1 are decreasing in the direction indicated by the arrows, as will readily be understood. Since a certain increase in the concentration in the containers 7.1.1 and 7.1.2 relative to the container separation by means of membranes cannot be excluded, a larger quantity of $L'_2$ is used in the low pressure rinsing phase than would correspond to the amount of inflowing solution required by the reverse osmosis. The effect of the increase in concentration by reintermixing decreases that much more the greater the number of the stages n. For this reason it is further proposed according to the present invention to replace a certain number of stages by individual containers 7.1 and 7.2 having fill bodies (see FIGS. 5a and 5b). These fill bodies longitudinally divide the containers into a nearly infinite number of small individual containers.

It is further proposed according to the present invention to introduce the stream of higher specific weight from below and the stream of lower specific weight from above into the proposed membraneless container, as a result of which the reintermixing will be reduced.

Lamellae-type fill bodies according to FIG. 5a, through which the flow is laminar, have proven to be particularly advantageous. Whereas with circular cylindrical or channel-like fill bodies and laminar flow the fastest lines of flow are about twice as fast as the integral average, in contrast thereto, the fastest lines of flow between parallel lamellae are only about 1.5 times as fast. These ratios are a function of the fluid-dynamic material properties of the flowing medium.

Figure 6:
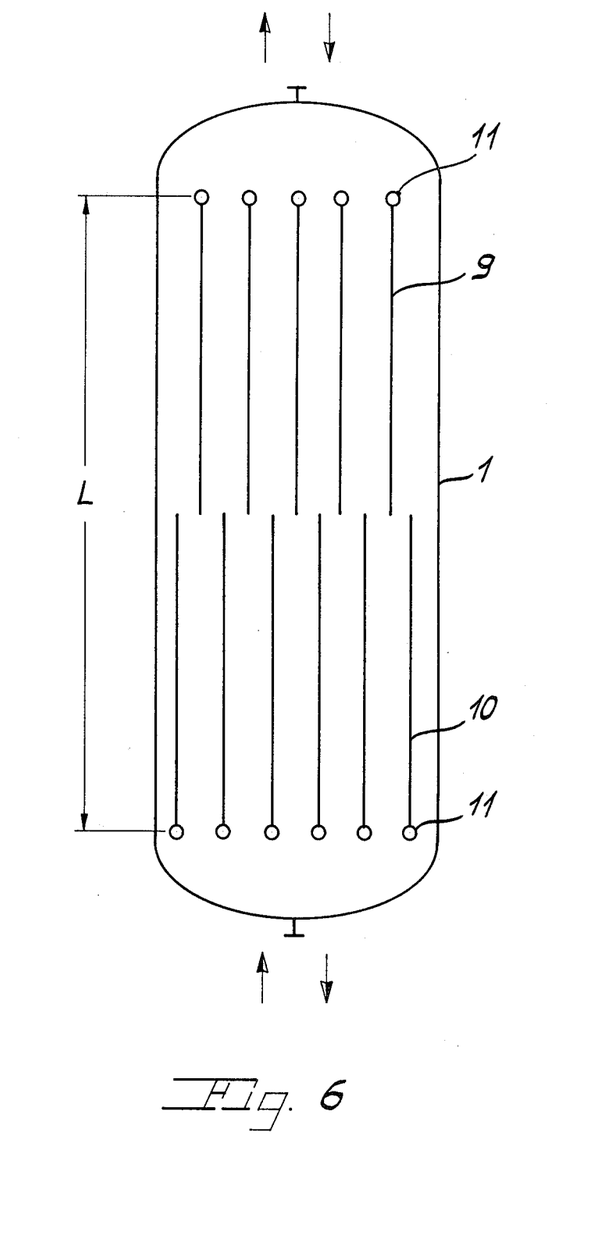
FIG. 6 is a flow diagram indicating a container with lamellae offset relative to one another in pairs.

A considerable improvement of these ratios can further be achieved if the lamellae are offset relative to one another in pairs (see FIG. 6). In this case, with the same total lamellae surface, the fastest lines of flow are only about 1.31 times as fast as the integral average. As a result of the laminar flow, in accordance with fluid dynamic principles, no intermixing of consecutive flowing material streams takes place. The speed of diffusion is insignificant. The nonetheless existing tendency for intermixing can further be reduced, according to the present invention, by storing the stream of high specific weight in the lower portion of the dual space container. With the respectively reversed stream, a reversal of the flow profile and thereby an equalization takes place. FIG. 6 shows a correspondingly paired arrangement of the lamellae 9 and 10 in the dual space container-pressure tank 1. The devices 11 at the upper and lower ends of the lamellae serve to improve the entrance distribution of the stream. The number of lamellae pairs 9 and 10 comprising the lamellae unit is not significant. However, a number of pairs is of practical expediency.

Although in the rinsing phase the quantity $L'_s$ is greater than the required quantity of solution $L_2$, an increase of about 40% for the quantity to be conveyed is slight relative to the total energy consumed, since the power required for this material stream is of little significance anyway, and the greater quantity of flow is compensated for by the lower pressure loss of a lamellae container relative to the required pump power of a membrane container.

The present invention is, of course, in no way restricted to the specific disclosure of the specification and drawings, but also encompasses any modifications within the scope of the appended claims.

What I claim is:

1. A method for efficiently separating a salt-containing solution of sea water having a salt content of 38,000 ppm at an initial pressure ($P_0$) into a low salt permeate having a salt content of 500 ppm at pressure ($P_0$) and a high salt concentrate having a salt content of 57,000 ppm at a final pressure equal to ($P_0$) by pressuring the solution to a high pressure ($P_1$) in an input line upstream of a reverse osmosis permeable membrane of a reverse osmosis vessel, wherein the efficiency of the process is increased by utilizing first and second displacement vessels with each displacement vessel having rigid internal surfaces divided by a flexible wall into a first chamber connected to said reverse osmosis vessel and a second chamber connected to the input line of said reverse osmosis vessel; the method comprising the steps of:

A. pumping the solution to the pressure ($P_1$) and supplying the solution to said reverse osmosis vessel at pressure ($P_1$) to produce the low salt premeate downstream of the membrane at pressure ($P_0$) and high salt concentrate upstream of the membrane at pressure ($P_2$) less than ($P_1$);

B. applying the concentrate from said reverse osmosis vessel only to the first chamber of the first displacement vessel at the pressure ($P_2$) while opening the first chamber of the second displacement vessel to ambient pressure ($P_0$); pumping the solution in the second chamber of the first displacement vessel into the input line by overcoming the pressure difference between the pressure ($P_3$) of the solution in the second chamber of the first vessel and the pressure ($P_1$) of the solution in the input line with a pump disposed between the displacement vessel and input line, and pumping solution to the second chamber of the second displacement vessel at a pressure ($P_4$) considerably lower than the pressure required to pump solution from the first displacement vessel to the input line in order to move the wall in the second displacement vessel and push the concentrate from the first chamber of the second displacement vessel to evacuate concentrate from the second displacement vessel;

C. reversing the processes of step B by applying the concentrate from said reverse osmosis vessel only to the first chamber of the second displacement vessel at the pressure ($P_2$) while opening the first chamber of the first vessel to ambient pressure ($P_0$), pumping the solution in the second chamber of the second displacement vessel into the input line by overcoming the pressure difference between the pressure ($P_3$) of the solution in the second chamber of the second displacement vessel and the pressure ($P_1$) of the solution in the input line with a pump disposed between the displacement vessel and input line, and pumping solution to the second chamber of the first displacement vessel at the pressure ($P_4$) to move the wall in the first displacement vessel and push the concentrate from the first chamber of the first displacement vessel to evacuate concentrate from the first displacement vessel;

D. repeating step B and C while continuously performing step A with the pressures maintained as follows:

$P_0 = 1$ bar $P_1 = 80$ bar $P_2 = 75$ bar $P_3 = 73$ bar $P_4 = 3$ bar, whereby the efficiency of the method is enhanced while avoiding the possibility that the low salt permeate will be contaminated by either the salt-containing solution or the high salt concentrate, should either of the displacement vessels rupture or fail.

* * * * *